United States Patent
Gaither et al.

(10) Patent No.: US 12,263,811 B2
(45) Date of Patent: Apr. 1, 2025

(54) OBJECT DETECTION SYSTEM FOR A VEHICLE

(71) Applicant: Toyota Motor Engineering & Manufacturing North America, Inc., Plano, TX (US)

(72) Inventors: Geoffrey David Gaither, Ann Arbor, MI (US); Allison McGowan, Ann Arbor, MI (US); Nathan Westover, New Hudson, MI (US)

(73) Assignees: TOYOTA MOTOR ENGINEERING & MANUFACTURING NORTH AMERICA, INC, Plano, TX (US); TOYOTA JIDOSHA KABUSHIKI KAISHA, Toyota (JP)

(*) Notice: Subject to any disclaimer, the term of this patent is extended or adjusted under 35 U.S.C. 154(b) by 105 days.

(21) Appl. No.: 17/830,520

(22) Filed: Jun. 2, 2022

(65) Prior Publication Data
US 2023/0391290 A1    Dec. 7, 2023

(51) Int. Cl.
*B60R 25/31* (2013.01)
*B60R 25/01* (2013.01)
*B60R 25/04* (2013.01)
*B60R 25/10* (2013.01)
*B60R 25/30* (2013.01)

(52) U.S. Cl.
CPC ............ *B60R 25/31* (2013.01); *B60R 25/016* (2013.01); *B60R 25/04* (2013.01); *B60R 25/10* (2013.01); *B60R 25/1001* (2013.01); *B60R 25/307* (2013.01); *B60R 2025/1016* (2013.01)

(58) Field of Classification Search
CPC ....... B60R 25/31; B60R 25/016; B60R 25/04; B60R 25/10; B60R 25/1001; B60R 25/307; B60R 2025/1016
See application file for complete search history.

(56) References Cited

U.S. PATENT DOCUMENTS

| 7,170,401 B1 | 1/2007 | Cole |
| 7,190,253 B2 | 3/2007 | Shimomura |
| 8,232,874 B1 | 7/2012 | Aneiros et al. |
| 8,836,489 B2 | 9/2014 | Christensen et al. |
| 10,328,896 B2 | 6/2019 | Salter et al. |
| 10,777,068 B2 | 9/2020 | De et al. |
| 2015/0284984 A1* | 10/2015 | Kanter ............. E05F 15/74 49/31 |
| 2019/0061687 A1* | 2/2019 | Khalil ............. B60R 25/2072 |

(Continued)

FOREIGN PATENT DOCUMENTS

| BR | 102015021267 A2 * | 3/2017 |
| CN | 104691500 A  * | 6/2015 |

(Continued)

OTHER PUBLICATIONS

Seubert et al. DE 19729404 Machine English Translation, ip.com (Year: 1999).*

*Primary Examiner* — Karen Beck
(74) *Attorney, Agent, or Firm* — Jordan IP Law, LLC (57) ABSTRACT

Vehicle systems, computer-implemented methods, and computer program products to enhance the situational competency and/or the safe operation of a vehicle by automatically controlling the vehicle in response to a biometric attribute analysis of one or more objects detected within a predetermined threshold distance of the vehicle.

17 Claims, 5 Drawing Sheets

(56) References Cited

U.S. PATENT DOCUMENTS

| | | | | |
|---|---|---|---|---|
| 2020/0193368 A1* | 6/2020 | Bhatia | ............... | B60R 25/25 |
| 2021/0362675 A1* | 11/2021 | Wale | ............... | B60R 25/04 |
| 2023/0174020 A1* | 6/2023 | Kang | ............... | B62D 1/181 |
| | | | | 701/48 |

FOREIGN PATENT DOCUMENTS

| | | | | | |
|---|---|---|---|---|---|
| CN | 109606316 A | * | 4/2019 | | |
| CN | 111075306 A | * | 4/2020 | ............ | E05F 15/73 |
| CN | 113581128 A | * | 11/2021 | | |
| CN | 113928266 B | * | 10/2022 | | |
| DE | 19729404 A1 | * | 2/1999 | ............ | B60R 25/04 |
| KR | 20200094506 A | * | 8/2020 | | |
| WO | WO 9601752 | * | 1/1996 | | |
| WO | WO-9601752 A1 | * | 1/1996 | .......... | B60R 25/066 |
| WO | WO-2017035620 A1 | * | 3/2017 | | |

* cited by examiner

OBJECT DETECTION SYSTEM FOR A VEHICLE

TECHNICAL FIELD

One or more embodiments relate generally to vehicle systems, computer-implemented methods, and computer program products to enhance the situational competency and/or the safe operation of a vehicle by automatically controlling the vehicle in response to a biometric attribute analysis of one or more objects detected within a predetermined threshold distance of the vehicle.

BACKGROUND

Unsupervised children or other unauthorized persons and animals may approach an unattended vehicle and gain access to the vehicle passenger cabin or compartment. The controls, components, systems, and sub-systems of the vehicle may be accessed, which could create a safety hazard to the child, animal, vehicle, and the ambient environment surrounding the vehicle.

BRIEF SUMMARY

Vehicle systems, computer-implemented methods, and computer program products to enhance the situational competency and/or the safe operation of a vehicle by automatically controlling the vehicle in response to execution of a biometric attribute analysis of one or more objects detected within a predetermined threshold distance of the vehicle.

Because state-of-the-art vehicles are generally equipped with a plurality of on-board sensors operable that perform a plurality of functions during operation of the vehicle, one or more example embodiments are to leverage the pre-existing on-board sensors to execute functions for the safety and security of a detected object, the vehicle, and contents within the vehicle.

In accordance with one or more embodiments, an example vehicle system may comprise one or more of the following: a non-transitory memory operatively coupled to one or more processors comprising a set of instructions executable by the one or more processors to cause the one or more processors to automatically control the vehicle in response to executing a biometric attribute analysis of one or more objects detected within a predetermined threshold distance of the vehicle.

In accordance with the example vehicle system, prior to automatically controlling the vehicle, the set of instructions are executable by the one or more processors to cause the one or more processors to, prior to automatically controlling the vehicle dynamically detect, in an ambient environment of the vehicle, a presence of the one or more objects within the predetermined threshold distance of the vehicle, and then dynamically execute the biometric attribute analysis of the biometric sensor data and stored biometric data.

In accordance with the example vehicle system, the detected one or more objects comprise an unsupervised child, an unauthorized person, and/or an animal.

In accordance with the example vehicle system, the detected one or more biometric attributes comprises a biometric attribute of the detected one or more objects.

In accordance with the example vehicle system, the biometric attribute is a physiological biometric attribute of the detected one or more objects.

In accordance with the example vehicle system, the physiological biometric attribute is one or more of the height, weight, face, voice, eyes, and fingerprint of the detected one or more objects.

In accordance with the example vehicle system, dynamically executing the biometric attribute analysis of the biometric sensor data and stored biometric data comprises executing a comparison of one or more of the height, weight, face, voice, eyes, and fingerprint of the detected one or more objects to a predetermined threshold biometric value.

In accordance with the example vehicle system, the automatic control of the vehicle comprises causing the vehicle to activate/deactivate one or more vehicle systems in response to the comparison.

In accordance with the example vehicle system, causing the vehicle to activate/deactivate one or more vehicle systems comprises automatically locking each door of the vehicle.

In accordance with the example vehicle system, causing the vehicle to activate/deactivate one or more vehicle systems comprises automatically closing each window of the vehicle.

In accordance with the example vehicle system, causing the vehicle to activate/deactivate one or more vehicle systems comprises automatically disabling activation of the vehicle engine.

In accordance with the example vehicle system, causing the vehicle to activate/deactivate one or more vehicle systems comprises automatically transmitting one or more of a visual alarm, an audio alarm, and a haptic alarm.

In accordance with the example vehicle system, causing the vehicle to activate/deactivate one or more vehicle systems comprises automatically transmitting a notification to an owner of the vehicle.

In accordance with the example vehicle system, causing the vehicle to activate/deactivate one or more vehicle systems comprises automatically activating the vehicle HVAC system.

In accordance with one or more embodiments, an example computer-implemented method of operating a vehicle may comprise one or more of the following: automatically controlling the vehicle in response to executing a biometric attribute analysis of one or more objects detected within a predetermined threshold distance of the vehicle.

In accordance with the example computer-implemented method, prior to automatically controlling the vehicle, the computer-implemented method of further comprises dynamically detecting, in an ambient environment of the vehicle, a presence of the one or more objects within the predetermined threshold distance of the vehicle, and then dynamically executing the biometric attribute analysis of the biometric sensor data and stored biometric data.

In accordance with the example computer-implemented method, the detected one or more objects comprise an unsupervised child, an unauthorized person, and/or an animal.

In accordance with the example computer-implemented method, the detected one or more biometric attributes comprises a biometric attribute of the detected one or more objects.

In accordance with the example computer-implemented method, the biometric attribute is a physiological biometric attribute of the detected one or more objects.

In accordance with the example computer-implemented method, the physiological biometric attribute is one or more of the height, weight, face, voice, eyes, and fingerprint of the detected one or more objects.

In accordance with the example computer-implemented method, dynamically executing the biometric attribute analysis of the biometric sensor data and stored biometric data comprises executing a comparison of one or more of the height, weight, face, voice, eyes, and fingerprint of the detected one or more objects to a predetermined threshold biometric value.

In accordance with the example computer-implemented method, the automatic control of the vehicle comprises causing the vehicle to activate/deactivate one or more vehicle systems in response to the comparison.

In accordance with the example computer-implemented method, causing the vehicle to activate/deactivate one or more vehicle systems comprises automatically locking each door of the vehicle.

In accordance with the example computer-implemented method, causing the vehicle to activate/deactivate one or more vehicle systems comprises automatically closing each window of the vehicle.

In accordance with the example computer-implemented method, causing the vehicle to activate/deactivate one or more vehicle systems comprises automatically disabling activation of the vehicle engine.

In accordance with the example computer-implemented method, causing the vehicle to activate/deactivate one or more vehicle systems comprises automatically transmitting one or more of a visual alarm, an audio alarm, and a haptic alarm.

In accordance with the example computer-implemented method, causing the vehicle to activate/deactivate one or more vehicle systems comprises automatically transmitting a notification to an owner of the vehicle.

In accordance with the example computer-implemented method, causing the vehicle to activate/deactivate one or more vehicle systems comprises automatically activating the vehicle HVAC system.

In accordance with one or more embodiments, an example computer program product including at least one computer readable medium, comprising a set of instructions, which when executed by one or more processors, cause the one or more processors to execute one or more of the following: automatically control the vehicle in response to executing a biometric attribute analysis of one or more objects detected within a predetermined threshold distance of the vehicle.

In accordance with the example computer program product, the set of instructions, which when executed by one or more processors, cause the one or more processors to automatically control the vehicle in response to executing a biometric attribute analysis of one or more objects detected within a predetermined threshold distance of the vehicle.

In accordance with the example computer program product, prior to automatically controlling the vehicle, the set of instructions, which when executed by one or more processors, cause the one or more processors to: dynamically detect, in an ambient environment of the vehicle, a presence of the one or more objects within the predetermined threshold distance of the vehicle, and then dynamically execute the biometric attribute analysis of the biometric sensor data and stored biometric data.

In accordance with the example computer program product, the detected one or more objects comprise an unsupervised child, an unauthorized person, and/or an animal.

In accordance with the example computer program product, the detected one or more biometric attributes comprises a biometric attribute of the detected one or more objects.

In accordance with the example computer program product, the biometric attribute is a physiological biometric attribute of the detected one or more objects.

In accordance with the example computer program product, the physiological biometric attribute is one or more of the height, weight, face, voice, eyes, and fingerprint of the detected one or more objects.

In accordance with the example computer program product, dynamically executing the biometric attribute analysis of the biometric sensor data and stored biometric data comprises executing a comparison of one or more of the height, weight, face, voice, eyes, and fingerprint of the detected one or more objects to a predetermined threshold biometric value.

In accordance with the example computer program product, the automatic control of the vehicle comprises causing the vehicle to activate/deactivate one or more vehicle systems in response to the comparison.

In accordance with the example computer program product, causing the vehicle to activate/deactivate one or more vehicle systems comprises automatically locking each door of the vehicle.

In accordance with the example computer program product, causing the vehicle to activate/deactivate one or more vehicle systems comprises automatically closing each window of the vehicle.

In accordance with the example computer program product, causing the vehicle to activate/deactivate one or more vehicle systems comprises automatically disabling activation of the vehicle engine.

In accordance with the example computer program product, causing the vehicle to activate/deactivate one or more vehicle systems comprises automatically transmitting one or more of a visual alarm, an audio alarm, and a haptic alarm.

In accordance with the example computer program product, causing the vehicle to activate/deactivate one or more vehicle systems comprises automatically transmitting a notification to an owner of the vehicle.

In accordance with the example computer program product, causing the vehicle to activate/deactivate one or more vehicle systems comprises automatically activating the vehicle HVAC system.

In accordance with one or more embodiments, an example vehicle may comprise one or more of the following: a sensor module having one or more sensors; one or more vehicle systems; and a non-transitory memory operatively coupled to one or more processors comprising a set of instructions executable by the one or more processors to cause the one or more processors to automatically control the vehicle in response to executing a biometric attribute analysis of one or more objects detected within a predetermined threshold distance of the vehicle.

In accordance with the example vehicle, prior to automatically controlling the vehicle, the set of instructions are executable by the one or more processors to cause the one or more processors to, prior to automatically controlling the vehicle, cause a dynamic detection via the one or more sensors, in an ambient environment of the vehicle, of a presence of the one or more objects within the predetermined threshold distance of the vehicle, and then dynamically execute the biometric attribute analysis of the biometric sensor data and stored biometric data.

In accordance with the example vehicle, the detected one or more objects comprise an unsupervised child, an unauthorized person, and/or an animal.

In accordance with the example vehicle, the detected one or more biometric attributes comprises a biometric attribute of the detected one or more objects.

In accordance with the example vehicle, the biometric attribute is a physiological biometric attribute of the detected one or more objects.

In accordance with the example vehicle, the physiological biometric attribute is one or more of the height, weight, face, voice, eyes, and fingerprint of the detected one or more objects.

In accordance with the example vehicle, dynamically executing the biometric attribute analysis of the biometric sensor data and stored biometric data comprises executing a comparison of one or more of the height, weight, face, voice, eyes, and fingerprint of the detected one or more objects to a predetermined threshold biometric value.

In accordance with the example vehicle, the automatic control of the vehicle comprises causing the vehicle to activate/deactivate the one or more vehicle systems in response to the comparison.

In accordance with the example vehicle, causing the vehicle to activate/deactivate the one or more vehicle systems comprises automatically locking each door of the vehicle.

In accordance with the example vehicle, causing the vehicle to activate/deactivate the one or more vehicle systems comprises automatically closing each window of the vehicle.

In accordance with the example vehicle, causing the vehicle to activate/deactivate the one or more vehicle systems comprises automatically disabling activation of the vehicle engine.

In accordance with the example vehicle, causing the vehicle to activate/deactivate the one or more vehicle systems comprises automatically transmitting one or more of a visual alarm, an audio alarm, and a haptic alarm.

In accordance with the example vehicle, causing the vehicle to activate/deactivate the one or more vehicle systems comprises automatically transmitting a notification to an owner of the vehicle.

In accordance with the example vehicle, causing the vehicle to activate/deactivate the one or more vehicle systems comprises automatically activating the vehicle HVAC system.

BRIEF DESCRIPTION OF THE SEVERAL VIEWS OF THE DRAWINGS

The various advantages of the exemplary embodiments will become apparent to one skilled in the art by reading the following specification and appended claims, and by referencing the following drawings, in which:

DETAILED DESCRIPTION

Figure 1:
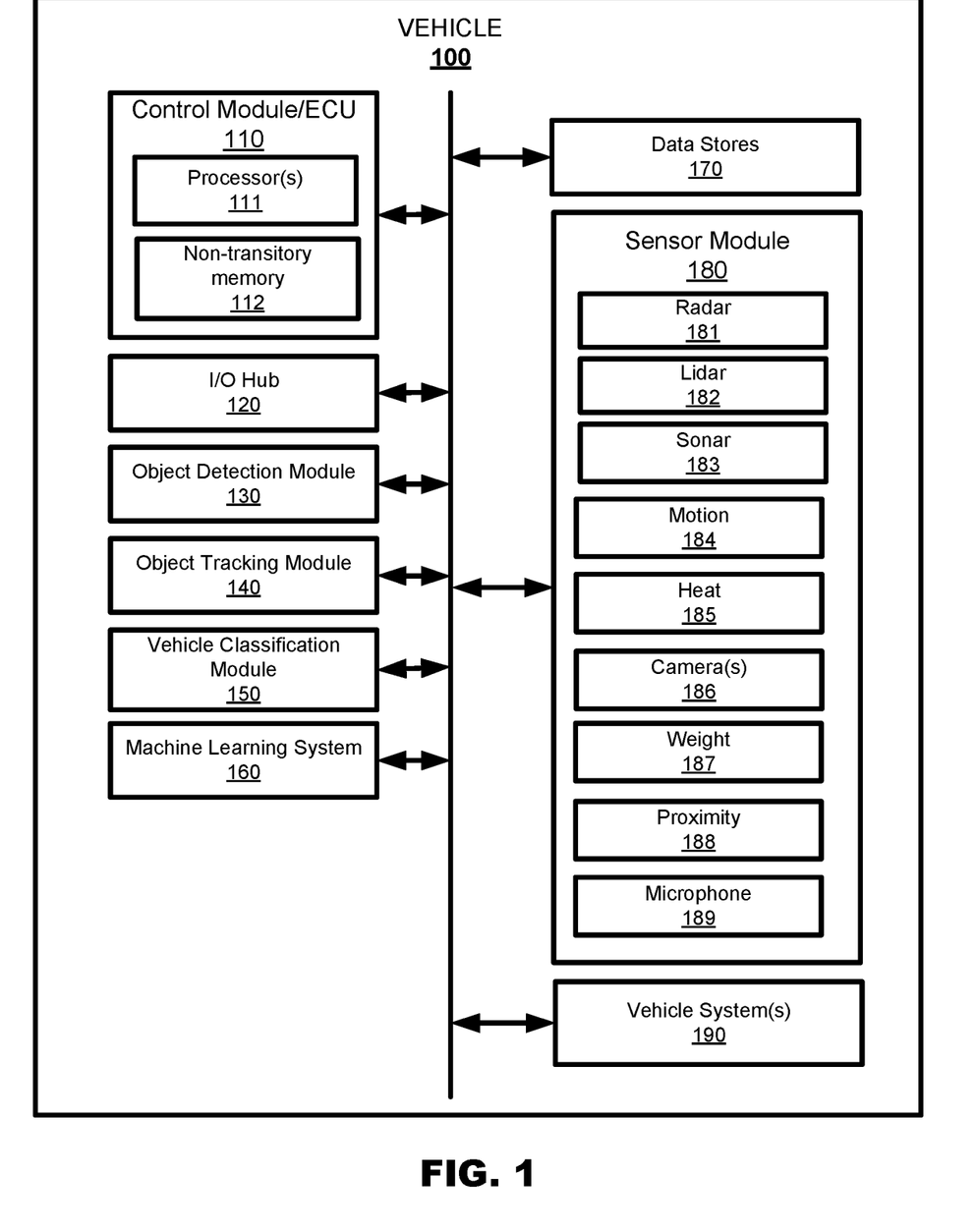
FIG. 1 illustrates an example of a vehicle, in accordance with one or more embodiments shown and described herein.

Turning to the figures, in which FIG. 1 illustrates a vehicle 100, in accordance with one or more embodiments. In accordance with one or more embodiments, a "vehicle" may be in reference to any form of motorized transport. In accordance with one or more embodiments, the vehicle 100 may comprise an automobile. Embodiments, however, are not limited thereto, and thus, the vehicle 100 may comprise a watercraft, an aircraft, or any other form of transport vehicle.

In accordance with one or more embodiments, the vehicle 100 may comprise an electric vehicle (EV), a hybrid electric vehicle (HEV), a plug-in hybrid electric vehicle (PHEV), a battery electric vehicle (BEV), and a fuel cell electric vehicle (FCEV).

In accordance with one or more embodiments, the vehicle 100 may comprise an autonomous vehicle. As described herein, an "autonomous vehicle" may comprise a vehicle that is configured to operate in an autonomous mode. As set forth, described, and/or illustrated herein, "autonomous mode" means that one or more computing systems are used to operate, and/or navigate, and/or maneuver the vehicle along a travel route with minimal or no input from a human driver. In accordance with one or more embodiments, the vehicle 100 may be configured to be selectively switched between an autonomous mode and a manual mode. Such switching may be implemented in any suitable manner (now known or later developed). As set forth, described, and/or illustrated herein, "manual mode" means that operation, and/or navigation, and/or maneuvering of the vehicle along a travel route, may, either in whole or in part, is to be performed by a human driver.

In accordance with one or more embodiments, the vehicle 100 may comprise one or more operational elements, some of which may be a part of an autonomous driving system. Some of the possible operational elements of the vehicle 100 are shown in FIG. 1 and will now be described. It will be understood that it is not necessary for the vehicle 100 to have all the elements illustrated in FIG. 1 and/or described herein. The vehicle 100 may have any combination of the various elements illustrated in FIG. 1. Moreover, the vehicle 100 may have additional elements to those illustrated in FIG. 1.

In accordance with one or more embodiments, the vehicle 100 may not include one or more of the elements shown in FIG. 1. Moreover, while the various operational elements are illustrated as being located within the vehicle 100, embodiments are not limited thereto, and thus, one or more of the operational elements may be located external to the vehicle 100, and even physically separated by large spatial distances.

In accordance with one or more embodiments, the example vehicle 100 comprises a control module/electronic control unit (ECU) 110, an I/O hub 120, an object detection module 130, an object tracking module 140, an object classification module 150, a machine learning (ML) system 160, one or more data stores 170, a sensor module 180, and one or more vehicle systems 190.

The control module/ECU 110 comprises one or more processors 111 and a non-transitory memory 112 operatively coupled to the one or more processors 111 comprising a set of instructions executable by the one or more processors 111 to cause the one or more processors 111 to execute one or more one or more instructions to control various operational systems, subsystems, and components of the vehicle 100. In accordance with one or more embodiments set forth, described, and/or illustrated herein, "processor" means any component or group of components that are configured to execute any of the processes described herein or any form of instructions to carry out such processes or cause such processes to be performed. The one or more processors 111 may be implemented with one or more general-purpose and/or one or more special-purpose processors. Examples of suitable processors include graphics processors, microprocessors, microcontrollers, DSP processors, and other circuitry that may execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The one or more processors 111 may comprise at least one hardware circuit (e.g., an integrated circuit) configured to carry out one or more instructions contained in program code. In embodiments in which there is a plurality of processors 111, such processors 111 may work independently from each other, or one or more processors 111 in the plurality may work in combination with each other. In one or more embodiments, the one or more processors 111 may be a host, main, or primary processor of the vehicle 100.

The I/O hub 120 may be operatively connected to other systems, subsystems, and components of the vehicle 100. The I/O hub 120 may comprise an input interface and an output interface. The input interface and the output interface may be integrated as a single, unitary interface, or alternatively, be separate as independent interfaces that are operatively connected.

Figure 3:
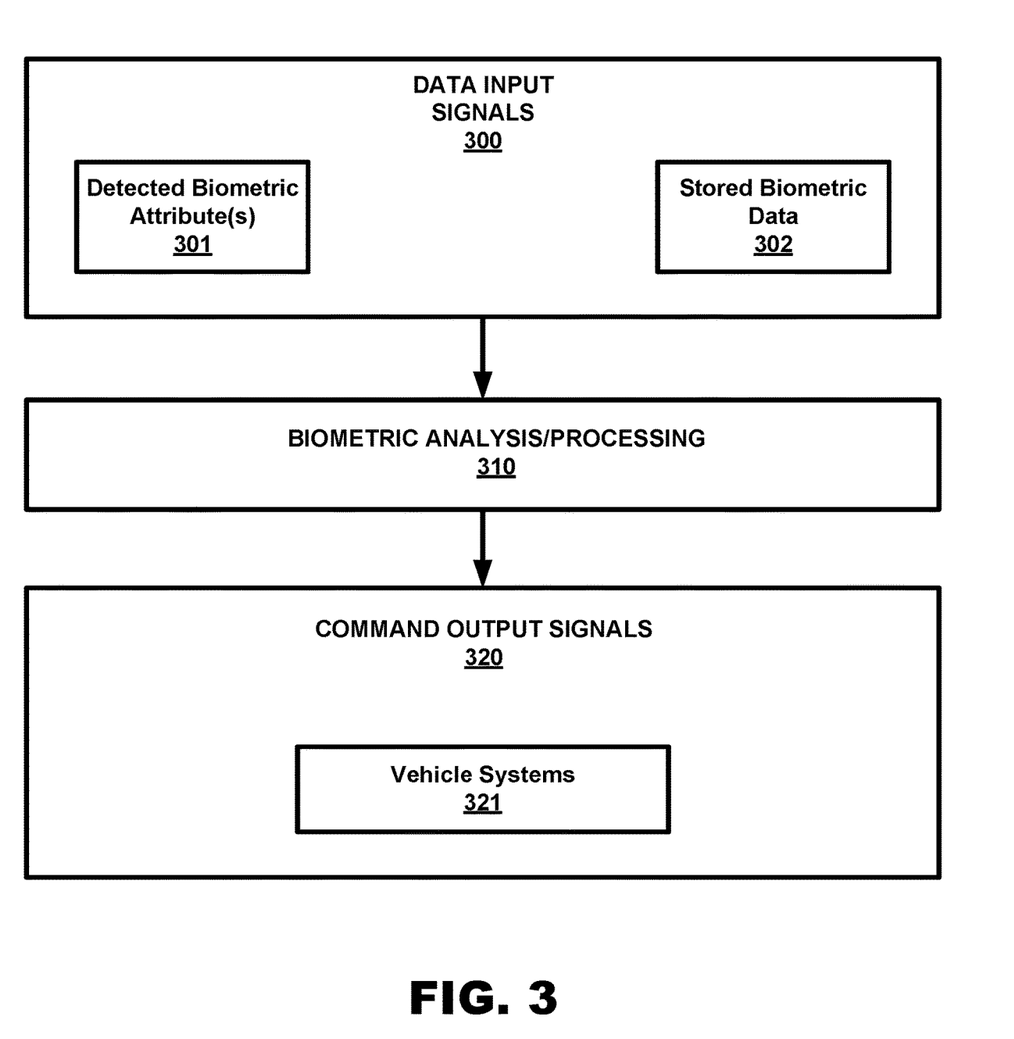
FIG. 3 illustrates a block diagram of one or more vehicle control blocks of an example vehicle system of the vehicle of FIG. 1.

In accordance with one or more embodiments, the input interface may be used by a user, such as, for example, a user, operator (including remote operator), or driver of the vehicle 100, to input a biometric data input signal 302 (See FIG. 3) to be stored in the one or more data stores 170 and/or accessible by the non-transitory memory 112.

The input interface is defined herein as any device, component, system, subsystem, element, or arrangement or groups thereof that enable information/data to be entered in a machine. The input interface may receive an input from the user, operator, or driver of the vehicle 100. In accordance with one or more example embodiments, the input interface may comprise a user interface (UI), graphical user interface (GUI) such as, for example, a display, human-machine interface (HMI), or the like. Embodiments, however, are not limited thereto, and thus, this disclosure contemplates the input interface comprising any suitable configuration that falls within the spirit and scope of the principles of this disclosure. For example, the input interface may comprise a keypad, toggle switch, touch screen, multi-touch screen, button, joystick, mouse, trackball, microphone and/or combinations thereof.

The output interface is defined herein as any device, component, system, subsystem, element, or arrangement or groups thereof that enable information/data to be presented to the vehicle operator and/or a remote operator of the vehicle 100. The output interface may be operable to present information/data to the vehicle occupant and/or the remote operator. The output interface may comprise one or more of a visual display or an audio display such as a microphone, earphone, and/or speaker. One or more components of the vehicle 100 may serve as both a component of the input interface and a component of the output interface.

The one or more data stores 170 are configured to store one or more types of data. The vehicle 100 may include interfaces that enable one or more systems thereof to manage, retrieve, modify, add, or delete, the data stored in the data stores 170. The one or more data stores 170 may comprise volatile and/or non-volatile memory. Examples of suitable data stores 170 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The one or more data stores 170 may be a component of the one or more processors 111, or alternatively, may be operatively connected to the one or more processors 111 for use thereby. As set forth, described, and/or illustrated herein, "operatively connected" may include direct or indirect connections, including connections without direct physical contact.

The sensor module 180 is operable, at least during operation of the vehicle 100, to dynamically detect, determine, assess, monitor, measure, quantify, and/or sense information about the vehicle 100 and an ambient or external environment of the vehicle 100. As set forth, described, and/or illustrated herein, "sensor" means any device, component and/or system that can perform one or more of detecting, determining, assessing, monitoring, measuring, quantifying, and sensing something. The one or more sensors may be configured to detect, determine, assess, monitor, measure, quantify and/or sense in real-time. As set forth, described, and/or illustrated herein, "real-time" means a level of processing responsiveness that a user or system senses as sufficiently immediate for a particular process or determination to be made, or that enables the processor to keep up with some external process.

The sensor module 180 may comprise for example, one or more sensors operable to detect, determine, assess, monitor, measure, quantify, and/or sense objects in the ambient environment of the vehicle 100. The sensors include, but not limited to ranging sensors (e.g., light detection and ranging, radio detection and ranging/radar, sound navigation and ranging/sonar), depth sensors, and image sensors (e.g., red, green, blue/RGB camera, multi-spectral infrared/IR camera). In the illustrated example of FIG. 1, the sensor module 180 comprises a radar sensor 181, a lidar sensor 182, a sonar sensor 183, a motion sensor 184, a heat sensor 185, one or more cameras 186, one or more weight sensors 187 provided in the seats of the vehicle 100, one or more proximity sensors 188, and one or more audio sensors or microphones 189. It will be understood that the embodiments are not limited to the particular sensors described herein.

The one or more sensors 181-189 may be configured to detect, determine, assess, monitor, measure, quantify, and/or sense information about the ambient environment in which the vehicle 100 is operating, including information about objects in the ambient environment. Such objects may include, but is not limited to, unsupervised children, an unauthorized person/pedestrian, an animal, etc. in the ambient environment relative to the vehicle 100. In one or more example embodiments, detection of objects in the ambient environment may come from one or more You Only Look Once (YOLO) detectors or one or more Single Shot Detectors (SSD).

The sensor module 180 and/or the one or more sensors 181-189 may be operatively connected to the control module/ECU 110, the one or more data stores 170, and/or other elements, components, systems, subsystems, and modules of the vehicle 100. The sensor module 180 and/or any of the one or more sensors 181-189 described herein may be provided or otherwise positioned in any suitable location with respect to the vehicle 100. For example, one or more of the sensors 181-189 may be located within the vehicle 100, one or more of the sensors 181-189 may be located on the exterior of the vehicle 100, one or more of the sensors 181-189 may be located to be exposed to the exterior of the vehicle 100, and/or one or more of the sensors 181-189 may be located within a component of the vehicle 100. The one or more sensors 181-189 may be provided or otherwise positioned in any suitable that permits practice of the one or more embodiments.

In accordance with one or more embodiments, the one or more sensors 181-189 may work independently from each other, or alternatively, may work in combination with each other. The sensors 181-189 may be used in any combination, and may be used redundantly to validate and improve the accuracy of the detection.

In accordance with one or more embodiments, the sensor module 180 may comprise one or more radar sensors 181. As set forth, described, and/or illustrated herein, "radar sensor" means any device, component and/or system that can detect, determine, assess, monitor, measure, quantify, and/or sense something using, at least in part, radio signals. The one or more radar sensors 181 may be configured to detect, determine, assess, monitor, measure, quantify, and/or sense, directly or indirectly, the presence of objects in the ambient environment of the vehicle 100, the relative position of each detected object relative to the vehicle 100, the spatial distance between each detected object and the vehicle 100 in one or more directions (e.g., in a longitudinal direction, a lateral direction, and/or other direction(s)), the spatial distance between each detected object and other detected objects in one or more directions (e.g., in a longitudinal direction, a lateral direction, and/or other direction(s)), a current speed of each detected object, and/or the movement of each detected object.

In accordance with one or more embodiments, the sensor module 180 may comprise one or more lidar sensors 182. As set forth, described, and/or illustrated herein, "lidar sensor" means any device, component and/or system that can detect, determine, assess, monitor, measure, quantify, and/or sense something using at least in part lasers. Such devices may comprise a laser source and/or laser scanner configured to transmit a laser and a detector configured to detect reflections of the laser. The one or more lidar sensors 182 may be configured to operate in a coherent or an incoherent detection mode. The one or more lidar sensors 182 may comprise high resolution lidar sensors.

The one or more lidar sensors 182 may be configured to detect, determine, assess, monitor, measure, quantify and/or sense, directly or indirectly, the presence of objects in the ambient environment of the vehicle 100, the position of each detected object relative to the vehicle 100, the spatial distance between each detected object and the vehicle 100 in one or more directions (e.g., in a longitudinal direction, a lateral direction and/or other direction(s)), the elevation of each detected object, the spatial distance between each detected object and other detected objects in one or more directions (e.g., in a longitudinal direction, a lateral direction, and/or other direction(s)), the speed of each detected object, and/or the movement of each detected object, the current speed of each detected object, and/or the movement of each detected object. The one or more lidar sensors 182 may generate a three-dimensional (3D) representation (e.g., image) of each detected object that may be used to compare to representations of known object types via the one or more data stores 170. Alternatively or additionally, data acquired by the one or more lidar sensors 182 may be processed to determine such things.

In accordance with one or more embodiments, the sensor module 180 may comprise one or more image devices such as, for example, one or more cameras 186. As set forth, described, and/or illustrated herein, "camera" means any device, component, and/or system that can capture visual data. Such visual data may include one or more of video information/data and image information/data. The visual data may be in any suitable form. The one or more cameras 186 may comprise high resolution cameras. The high resolution can refer to the pixel resolution, the spatial resolution, spectral resolution, temporal resolution, and/or radiometric resolution.

In accordance with one or more embodiments, the one or more cameras 186 may comprise high dynamic range (HDR) cameras or infrared (IR) cameras. One or more of the cameras 186 may comprise a lens and an image capture element. The image capture element may be any suitable type of image capturing device or system, including, for example, an area array sensor, a charge coupled device (CCD) sensor, a complementary metal oxide semiconductor (CMOS) sensor, a linear array sensor, and/or a CCD (monochrome). The image capture element may capture images in any suitable wavelength on the electromagnetic spectrum. The image capture element may capture color images and/or grayscale images. The one or more of the cameras 186 may be configured with zoom in and/or zoom out capabilities. The one or more cameras 186 may be spatially oriented, positioned, configured, operable, and/or arranged to capture visual data from at least a portion of the ambient environment of the vehicle 100, and/or any suitable portion within the vehicle 100. For instance, one or more of the cameras 186 may be located within the passenger cabin of the vehicle 100.

In accordance with one or more embodiments, the one or more cameras 186 may be fixed in a position that does not change relative to the vehicle 100. Alternatively or additionally, one or more of the cameras 186 may be movable so that its position can change relative to the vehicle 100 in a manner which facilitates the capture of visual data from different portions of the ambient environment of the vehicle 100. Such movement of the one or more cameras 186 may be achieved in any suitable manner, such as, for example, by rotation (about one or more rotational axes), by pivoting (about a pivot axis), by sliding (along an axis), and/or by extending (along an axis). The one or more cameras 186 (and/or the movement thereof) may be controlled by one or more of the control module/ECU 110, the sensor module 180, and any one or more of the modules, systems, and subsystems set forth, described, and/or illustrated herein.

In accordance with one or more embodiments, the control module/ECU 110 may be operable to dynamically transmit video or image data of the detected one or more objects (e.g., via a software application) to the owner of the vehicle 100 to permit the owner to confirm or deny access to the vehicle passenger compartment and/or systems, subsystems, components.

In accordance with one or more embodiments, the sensor module 180 may comprise one or more weight sensors 187. The one or more weight sensors 187 are operable to dynamically detect, determine, assess, monitor, measure, quantify, and/or sense when one or more vehicle seats in the vehicle passenger cabin are occupied by detecting a load applied to an external surface of a vehicle seat. The detected load is then output as an electric signal to the control module/ECU 110, where it is then compared to a predetermined threshold weight value stored in the non-transitory memory 112 and/or one or more data stores 170 for purposes of conducting biometric analysis. The one or more weight sensors 187 may be controlled by one or more of the control module/ECU 110, the sensor module 180, and any one or more of the modules, systems, and subsystems set forth, described, and/or illustrated herein.

The one or more microphones 189 are operable to serve as an audio sensor to dynamically detect, determine, assess, monitor, measure, quantify, and/or sense a voice or sound uttered by a detected object in the ambient environment. The detected voice or sound is then output as an electric signal to the control module/ECU 110, where it is then compared to an audio data sounds stored in the non-transitory memory 112 and/or one or more data stores 170 for purposes of conducting biometric analysis. The one or more microphones 189 may be controlled by one or more of the control module/ECU 110, the sensor module 180, and any one or more of the modules, systems, and subsystems set forth, described, and/or illustrated herein. In accordance with one or more example embodiments, one or more predetermined safe words may be stored in the one or more data stores 170. In response to a dynamic detection by the one or more microphones 189 of an utterance of the one or more safe words by the detected one or more objects, the control module/ECU 110 may automatically permit access to the passenger cabin of the vehicle 100.

Figure 2:
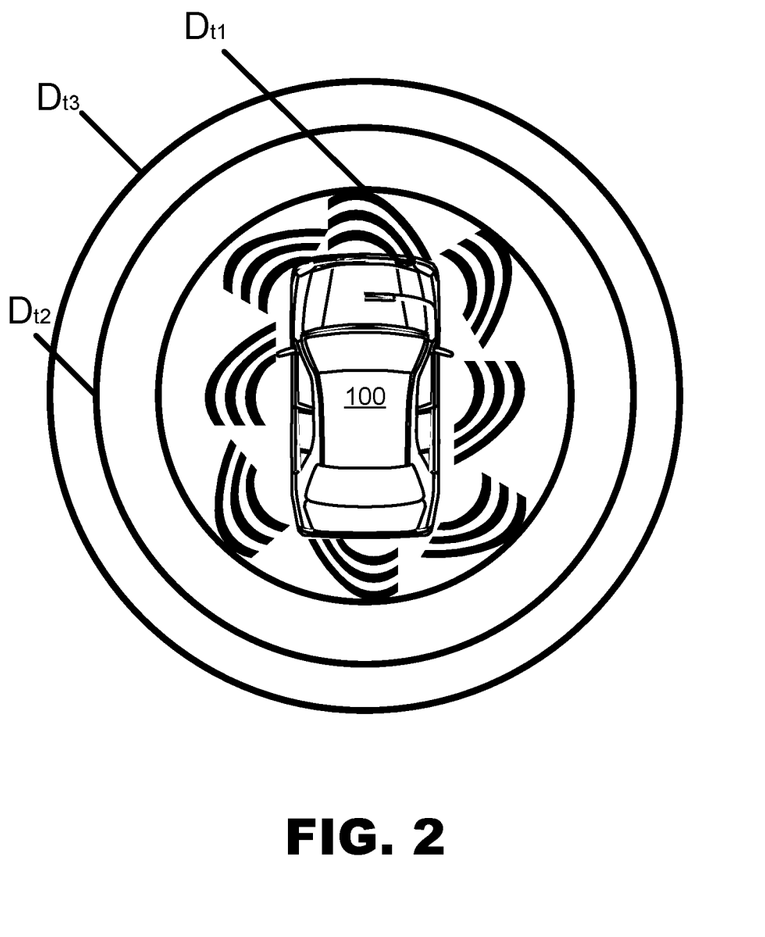
FIG. 2 illustrates the vehicle of FIG. 1 in an ambient environment.

During operation of the vehicle 100, the one or more processor(s) 111 may be configured to select one or more of the sensors 181-189 to dynamically detect, determine, assess, monitor, measure, quantify, and/or sense the ambient environment within a predetermined threshold distance $D_{t1}$, $D_{t2}$, $D_{t3}$ from the vehicle 100 (See, FIG. 2). Such predetermined threshold distance $D_{t1}$, $D_{t2}$, $D_{t3}$ may be user-selected by a user, operator (including remote operator), or driver of the vehicle 100, and stored in the non-transitory memory 112 and/or one or more data stores 170.

In accordance with one or more embodiments, the vehicle 100 may comprise an object detection module 130. The object detection module 130 may be implemented as computer readable program code that, when executed by a processor, implement one or more of the various processes set forth, described, and/or illustrated herein, including, for example, to detect objects in the ambient environment that are within the predetermined threshold distance $D_{t1}$, $D_{t2}$, $D_{t3}$ from the vehicle 100. The object detection module 130 may be a component of the control module/ECU 110, or alternatively, may be executed on and/or distributed among other processing systems to which the control module/ECU 110 is operatively connected. The object detection module 130 may include a set of logic instructions executable by the control module/ECU 110. Alternatively or additionally, the one or more data stores 170 may contain such logic instructions. The logic instructions may include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

The object detection module 130 may be configured to detect objects (e.g., unsupervised child, an unauthorized person/pedestrian, and/or an animal, etc.) in the ambient environment that are within the predetermined threshold distance $D_{t1}$, $D_{t2}$, $D_{t3}$ from the vehicle 100. The detection of objects may be performed in any suitable manner. For instance, the detection may be performed using data acquired by the sensor module 180.

In accordance with one or more embodiments, should any objects be detected, the object detection module 130 may also identify or classify the detected objects. The object detection module 130 can attempt to classify the objects by accessing object biometric data (e.g., image, weight, height, sound, etc.) located in an object database of the one or more data stores 170 or an external source (e.g., cloud-based data stores). The detected one or more objects may be classified based on a comparison of the detected biometric data with biometric data stored in the one or more data stores 170.

In accordance with one or more embodiments, the object detection module 130 may also include any suitable object recognition software configured to analyze the biometric sensor data captured by the sensor module 180. The object recognition software may query an object biometric database for possible matches. For instance, images captured by the sensor module 180 may be compared to images located in the object biometric database for possible matches. Alternatively or additionally, measurements or other aspects of an image captured by sensor module 180 may be compared to measurements or other aspects of images located in the object biometric database.

The object detection module 130 may identify the detected objects as a particular type of object should there be one or more matches between the captured image(s) and an image located in the object database. As set forth, described, and/or illustrated herein, a "match" or "matches" means that biometric information collected by the sensor module 180 and the biometric data located in the object biometric database are substantially identical. For example, an image or other information collected by the sensor module 180 and one or more of the images in the object biometric database may match within a predetermined threshold probability or confidence level.

In accordance with one or more embodiments, the vehicle 100 may comprise an object tracking module 140. The object tracking module 140 may be implemented as computer readable program code that, when executed by a processor, implements one or more of the various processes set forth, described, and/or illustrated herein, including, to one or more of follow, observe, watch, and track the movement of objects over a plurality of sensor observations. As set forth, described, and/or illustrated herein, "sensor observation" means a moment of time or a period of time in which the one or more sensors 181-186 of the sensor module 180 are used to acquire biometric sensor data of at least a portion of an ambient environment within the predetermined threshold distance $D_{t1}$, $D_{t2}$, $D_{t3}$ from the vehicle 100. The object tracking module 140 may be a component of the control module/ECU 110, or alternatively, may be executed on and/or distributed among other processing systems to which the control module/ECU 110 is operatively connected. The object tracking module 140 may comprise logic instructions executable by the control module/ECU 110. Alternatively or additionally, the one or more data stores 170 may contain such logic instructions. The logic instructions may include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

The object tracking module 140 and/or the control module/ECU 110 may be operable cause the dynamic tracking of the detected one or more objects that are within the predetermined threshold distance $D_{t1}$, $D_{t2}$, $D_{t3}$ from the vehicle 100. Such tracking of the classified objects may occur over a plurality of sensor detection moments or frames.

In accordance with one or more embodiments, the vehicle 100 may comprise an object classification module 150. The object classification module 150 may be implemented as computer readable program code that, when executed by a processor, implements one or more of the various processes set forth, described, and/or illustrated herein, including, for example, to classify an object in the driving environment. The object classification module 150 may be a component of the control module/ECU 110, or alternatively, may be executed on and/or distributed among other processing systems to which the control module/ECU 110 is operatively connected. The object classification module 150 may comprise logic instructions executable by the control module/ECU 110. Alternatively or additionally, the one or more data stores 170 may contain such logic instructions. The logic instructions may include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

In accordance with one or more embodiments, the object classification module 150 may be configured to detect, determine, assess, measure, quantify and/or sense, the object type of one or more detected objects that are within the predetermined threshold distance $D_{t1}$, $D_{t2}$, $D_{t3}$ from the vehicle 100 based on one or more object biometric features. The object classification module 150 may be configured to classify the type of one or more detected objects according to one or more defined object classifications stored in the one or more data stores 170. For example, the object classification may comprise persons, animals, and vehicles (e.g., cars, vans, trucks, motorcycles, buses, trailers, and semi-trailers). Embodiments, however, are not limited thereto, and thus, the object classification may comprise other object classifications.

In accordance with one or more embodiments, one or more of the modules 130, 140, 150, and 180 set forth, described, and/or illustrated herein may include artificial or computational intelligence elements, e.g., neural network, fuzzy logic, or other machine learning algorithms.

In accordance with one or more embodiments, the vehicle 100 may comprise machine learning (ML) system 160. As set forth, described, or illustrated herein, machine learning means computers and/or systems having an ability to learn without being explicitly programmed. Machine learning algorithms may be used to train one or more machine learning models of the vehicle 100 based on the biometric object data that is received via the one or more of the processors 111 of the control module/ECU 110, the one or more data stores 170, the sensor module 180, the vehicle system, 110, and any other input sources. The ML algorithms may include one or more of a linear regression algorithm, a logical regression algorithm, or a combination of different algorithms. A neural network may also be used to train the system based on the received data. The ML system 160 may analyze the received information or data related to the ambient environment relative to the vehicle 100 in order to enhance one or more of the object detection module 130, the object tracking module 140, the object classification module 150, the sensor module 180, and the vehicle systems 190. In one or more example embodiments, such a neural network may include, but is not limited to, a YOLO neural network.

In accordance with one or more embodiments, the ML system 160 may also receive information from one or more other vehicles and process the received information to dynamically determine patterns in the ambient environment. Information may be received based on preferences including location (e.g., as defined by geography from address, zip code, or GPS coordinates), planned travel routes (e.g., GPS alerts), activity associated with co-owned/shared vehicles, history, news feeds, and the like. The information (i.e., received or processed information) may also be uplinked to other systems and modules in the vehicle 100 for further processing to discover additional information that may be used to enhance the understanding of the information. The ML system 160 may also transmit information to other vehicles, and link to other electronic devices, including but not limited to smart phones, smart home systems, or Internet-of-Things (IoT) devices. The ML system 160 may thereby communicate with/to other vehicles and or persons.

In accordance with one or more embodiments, the ML system 160 may comprise one or more processors, and one or more data stores (e.g., non-volatile memory/NVM and/or volatile memory) containing a set of instructions, which when executed by the one or more processors, cause the ML system 160 to receive information from one or more of other vehicles, the one or more processors 111, the one or more data stores 170, the sensor module 180, the vehicle system, 110, and any other input/output sources, and process the received information to, inter alia, cause implementation of a driving maneuver. Embodiments, however, are not limited thereto, and thus, the ML system 160 may process the received information to do other aspects related to operation of the vehicle 100. The ML system 160 may communicate with and collect information from one or more of other vehicles, the one or more processors 111, the one or more data stores 170, the sensor module 180, the vehicle systems 110, and any other input/output sources to provide a deeper understanding of the monitored activities of the systems, components, and interfaces.

In accordance with one or more embodiment, the vehicle 100 may comprise one or more vehicle systems 190 and subsystems, such as, for example, an HVAC system, an entertainment system, a seat system, a window system, a door system, drive train system, a braking system, a steering system, a throttle system, a transmission system, a signaling system, a navigation system, a lighting system, a horn system. Embodiments, however, are not limited thereto, and thus, the vehicle 100 may comprise more, fewer, or different systems and subsystems. The control module/ECU 110 are operatively connected to communicate with the various vehicle systems 190 and/or individual components thereof.

Figure 4:
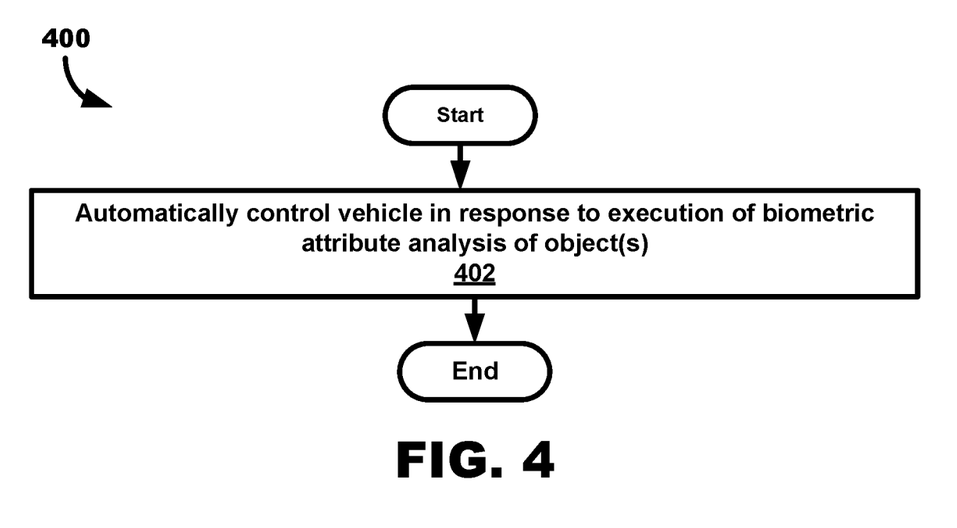
FIGS. 4 through 6 illustrate flowcharts of one or more example methods of operating the vehicle of FIG. 1.

As illustrated in FIG. 4, during operation of the vehicle 100, the control module/ECU 110 is operable to dynamically receive one or more data input signals 300 related to one or more detected biometric attributes 301 of one or more objects that are detected to be within the predetermined threshold distance $D_{t1}$, $D_{t2}$, $D_{t3}$ from the vehicle 100, and a stored biometric data 302. In response thereto, the control module/ECU 110 is operable to dynamically execute a biometric analysis 310 of the input signals associated with the one or more detected biometric attributes 301. The biometric analysis 310 comprises executing a comparison of the detected one or more detected biometric attributes 301 with the stored biometric data 302.

In accordance with one or more embodiments, the detected one or more biometric attributes 301 comprises a physiological biometric attribute of the detected one or more objects. For example, the physiological biometric attribute may be the height, weight, face, voice, eyes, fingerprint, etc. of the detected one or more objects.

In response to executing the biometric attribute analysis, the control module/ECU 110 is operable to transmit one or more output control signals 320, and particular, one or more output control signals 321 to one or more systems, subsystems, components of the vehicle systems 190 to automatically control the vehicle 100.

For example, should execution of the comparison reveal or otherwise determine that the detected height of the detected one or more objects is less than a predetermined threshold height value, the control module/ECU 110 is operable to transmit one or more output control signals 321 that restrict access to the vehicle passenger cabin. On the other hand, should execution of the comparison reveal that the detected height of the detected one or more objects is greater than the predetermined threshold height value, the control module/ECU 110 is operable to transmit one or more output control signals 321 that permits access to the vehicle passenger cabin, and/or the systems, subsystems, components of the vehicle systems 190. In such an instance, the control module/ECU 110 may also transmit one or more output control signals 321 to automatically activate the vehicle HVAC system to cool or heat the passenger cabin of the vehicle 100.

In another example, should the detected one or more objects gain access to the vehicle passenger cabin, and execution of the comparison reveals or otherwise determines that the detected weight of the detected one or more objects is less than a predetermined threshold weight value, the control module/ECU 110 is operable to transmit one or more output control signals 321 that restrict access to the systems, subsystems, components of the vehicle systems 190. On the other hand, should execution of the comparison reveal that the detected weight of the detected one or more objects is greater than the predetermined threshold weight value, the control module/ECU 110 is operable to transmit one or more output control signals 321 that permits access to the systems, subsystems, components of the vehicle systems 190. In such an instance, the control module/ECU 110 may transmit one or more output control signals 321 to automatically activate the vehicle HVAC system to cool or heat the passenger cabin of the vehicle 100.

In a further example, should execution of the comparison reveal or otherwise determine that the detected face, voice, eyes, or fingerprint of the detected one or more objects not biometrically match or biometrically correspond to a stored threshold face, voice, eyes, or fingerprint value, the control module/ECU 110 is operable to transmit one or more output control signals 321 that restrict access to the systems, subsystems, components of the vehicle systems 190. On the other hand, should execution of the comparison reveal that the detected face, voice, eyes, or fingerprint of the detected one or more objects biometrically match or biometrically correspond to a stored threshold face, voice, eyes, or fingerprint value, the control module/ECU 110 is operable to transmit one or more output control signals 321 that permits access to the vehicle passenger cabin, and/or the systems, subsystems, components of the vehicle systems 190. In such an instance, the control module/ECU 110 may also transmit one or more output control signals 321 to automatically activate the vehicle HVAC system to cool or heat the passenger cabin of the vehicle 100.

In accordance with one or more embodiments, the control module/ECU 110 is operable to automatically control the vehicle 100 by causing the vehicle 100 to activate/deactivate one or more vehicle systems 190.

For example, should a detected height value of the detected one or more objects be less than a predetermined threshold height value, the control module/ECU 110 is operable to automatically lock each door of the vehicle 100 before the detected one or more objects gain access to the passenger cabin of the vehicle 100. Alternatively or additionally, the control module/ECU 110 is operable to automatically close each window of the vehicle 100 before the detected one or more objects gain access to the passenger cabin of the vehicle 100.

Alternatively or additionally, the control module/ECU 110 is operable to automatically disable activation of the vehicle engine should the detected one or more objects gain access to the passenger cabin of the vehicle 100. This serves to prevent unauthorized operation of the vehicle 100. Alternatively or additionally, the control module/ECU 110 is operable to automatically activate the vehicle HVAC system should the detected one or more objects gain access to the passenger cabin of the vehicle 100.

Alternatively or additionally, the control module/ECU 110 is operable to automatically transmit one or more of a visual alarm, an audio alarm, and a haptic alarm to notify the vehicle owner. Alternatively or additionally, the control module/ECU 110 is operable to automatically transmit a notification (e.g., text or phone call) to the owner of the vehicle 100. Alternatively or additionally, the control module/ECU 110 is operable to automatically transmit the current GPS coordinates of the vehicle 100. Upon receipt of an alarm or notification, the owner of the to the vehicle 100 may send a return communication to authorize use of the vehicle 100. In which case, the control module/ECU 110 is operable to automatically permit the detected object to operate the vehicle 100.

In accordance with one or more embodiments, the owner of the vehicle 100 may, via an input interface of the I/O hub 120, input a time window in which an otherwise restricted detected object (e.g., a relative or friend) may gain limited access to the vehicle 100 for purposes of operating the vehicle 100 within the specific time window.

Illustrated examples shown in FIGS. 4 to 10 set forth example computer-implemented methods 400, 500, 600, 700, and 800 for operating a vehicle. The respective flowcharts of the example computer-implemented methods 400, 500, 600, 700, and 800 may be implemented by the one or more processors 111 of the ECU/Control module 110. In particular, the example computer-implemented methods 400, 500, 600, 700, and 800 may be implemented as one or more modules in a set of logic instructions stored in a non-transitory machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof.

Figure 5:
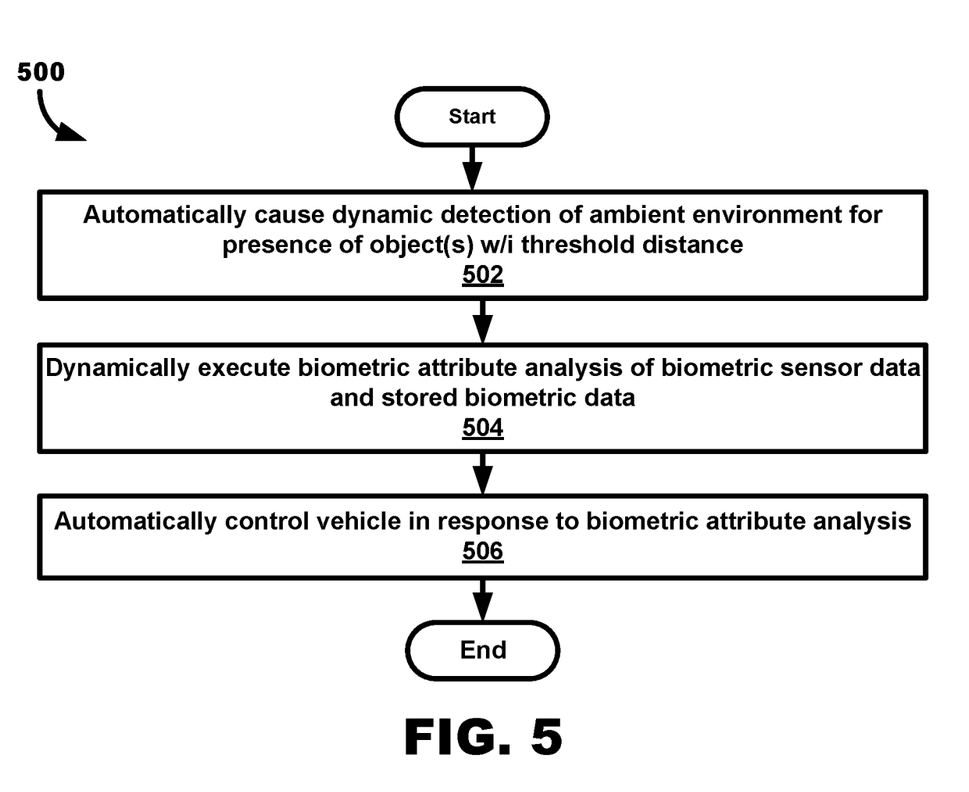
Figure 6:
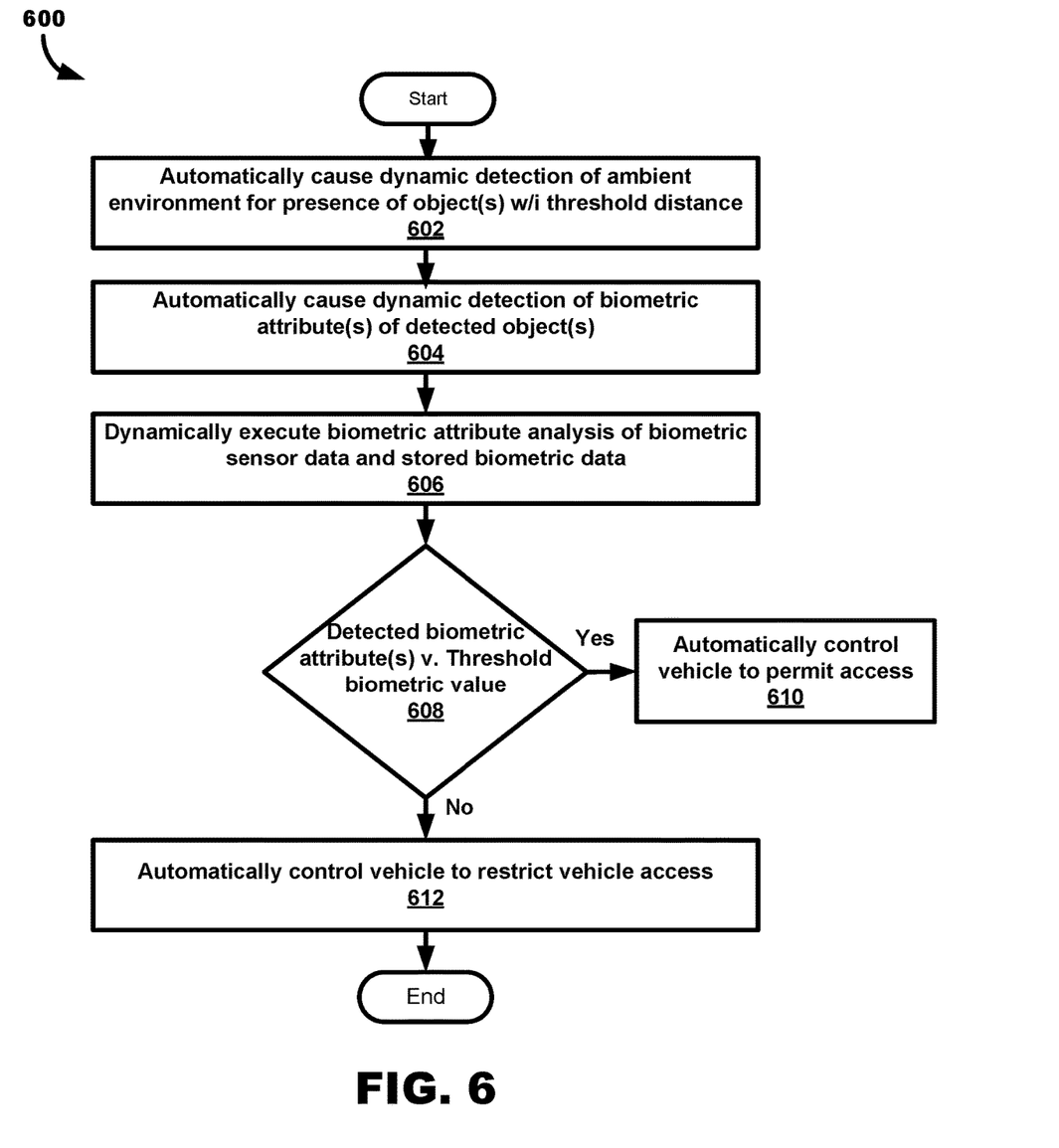

In the example computer-implemented methods 400, 500, 600, 700, and 800, software executed by the ECU/Control module 111 provides functionality described or illustrated herein. In particular, software executed by the one or more processors 111 of the ECU/Control module 110 is configured to perform one or more processing blocks of the example computer-implemented methods 400, 500, 600, 700, and 800 set forth, described, and/or illustrated herein, or provides functionality set forth, described, and/or illustrated.

In the illustrated example embodiment of FIG. 4, illustrated process block 402 includes automatically control the vehicle in response to executing a biometric attribute analysis of one or more objects detected within a predetermined threshold distance of the vehicle.

In accordance with the illustrated process block 402, the detected one or more objects comprise an unsupervised child, an unauthorized person, and/or an animal.

In accordance with the illustrated process block 402, the detected one or more biometric attributes comprises a biometric attribute of the detected one or more objects.

In accordance with the illustrated process block 402, the biometric attribute is a physiological biometric attribute of the detected one or more objects.

In accordance with the illustrated process block 402, the physiological biometric attribute is one or more of the height, weight, face, voice, eyes, and fingerprint of the detected one or more objects.

In accordance with the illustrated process block 402, executing the biometric attribute analysis of the biometric sensor data and stored biometric data comprises executing a comparison of one or more of the height, weight, face, voice, eyes, and fingerprint of the detected one or more objects to a predetermined threshold biometric value.

In accordance with the example illustrated process block 402, the automatic control of the vehicle comprises causing the vehicle to activate/deactivate one or more vehicle systems in response to the detected one or more of the height, weight, face, voice, eyes, and fingerprint of the detected one or more objects not biometrically match or biometrically correspond to a predetermined threshold biometric value.

In accordance with the example illustrated process block 402, causing the vehicle to activate/deactivate one or more vehicle systems comprises automatically locking each door of the vehicle.

In accordance with the example illustrated process block 402, causing the vehicle to activate/deactivate one or more vehicle systems comprises automatically closing each window of the vehicle.

In accordance with the example illustrated process block 402, causing the vehicle to activate/deactivate one or more vehicle systems comprises automatically disabling activation of the vehicle engine.

In accordance with the example illustrated process block 402, causing the vehicle to activate/deactivate one or more vehicle systems comprises automatically transmitting one or more of a visual alarm, an audio alarm, and a haptic alarm.

In accordance with the example illustrated process block 402, causing the vehicle to activate/deactivate one or more vehicle systems comprises automatically transmitting a notification to an owner of the vehicle.

In accordance with the example illustrated process block 402, causing the vehicle to activate/deactivate one or more vehicle systems comprises automatically activating the vehicle HVAC system.

The computer-implemented method 400 can terminate or end after execution of illustrated process block 402.

In the illustrated example embodiment of FIG. 5, illustrated process block 502 includes automatically causing a dynamic detection of an ambient environment within a predetermined threshold distance of the vehicle for a presence of the one or more objects.

In accordance with the illustrated process block 502, at least a portion of an ambient environment of the vehicle may be dynamically detected for the presence of the one or more objects.

In accordance with the illustrated process block 502, the detected one or more objects comprise an unsupervised child, an unauthorized person, and/or an animal.

In accordance with the illustrated process block 502, the dynamic detection comprises executing a dynamic detection of one or more biometric attributes (as biometric sensor data) of the detected one or more objects.

In accordance with the illustrated process block 502, the biometric attribute is a physiological biometric attribute of the detected one or more objects.

In accordance with the illustrated process block 502, the physiological biometric attribute is one or more of the height, weight, face, voice, eyes, and fingerprint of the detected one or more objects.

The method 500 may then proceed to illustrated process block 504, which includes dynamically executing a biometric attribute analysis of the biometric sensor data and stored biometric data of the detected one or more objects.

In accordance with the illustrated process block 504, executing the biometric attribute analysis of the biometric sensor data and the stored biometric data comprises executing a comparison of one or more of the height, weight, face, voice, eyes, and fingerprint of the detected one or more objects to a predetermined threshold biometric value.

The method 500 may then proceed to illustrated process block 506, which includes automatically controlling the vehicle in response to executing the biometric attribute analysis.

In accordance with the example illustrated process block 506, the automatic control of the vehicle comprises causing the vehicle to activate/deactivate one or more vehicle systems in response to the detected one or more of the height, weight, face, voice, eyes, and fingerprint of the detected one or more objects not biometrically match or biometrically correspond to a predetermined threshold biometric value.

In accordance with the example illustrated process block 506, causing the vehicle to activate/deactivate one or more vehicle systems comprises automatically locking each door of the vehicle.

In accordance with the example illustrated process block 506, causing the vehicle to activate/deactivate one or more vehicle systems comprises automatically closing each window of the vehicle.

In accordance with the example illustrated process block 506, causing the vehicle to activate/deactivate one or more vehicle systems comprises automatically disabling activation of the vehicle engine.

In accordance with the example illustrated process block 506, causing the vehicle to activate/deactivate one or more vehicle systems comprises automatically transmitting one or more of a visual alarm, an audio alarm, and a haptic alarm.

In accordance with the example illustrated process block 506, causing the vehicle to activate/deactivate one or more vehicle systems comprises automatically transmitting a notification to an owner of the vehicle.

In accordance with the example illustrated process block 506, causing the vehicle to activate/deactivate one or more vehicle systems comprises automatically activating the vehicle HVAC system.

The computer-implemented method 500 can terminate or end after execution of illustrated process block 506.

In the illustrated example embodiment of FIG. 6, illustrated process block 602 includes automatically causing a dynamic detection of an ambient environment within a predetermined threshold distance of the vehicle for a presence of the one or more objects.

In accordance with the illustrated process block 602, at least a portion of an ambient environment of the vehicle may be dynamically detected for the presence of the one or more objects.

In accordance with the illustrated process block 602, the detected one or more objects comprise an unsupervised child, an unauthorized person, and/or an animal.

The method 600 may then proceed to illustrated process block 604, which includes automatically cause dynamic detection of one or more biometric attributes (as biometric sensor data) of the detected one or more objects.

In accordance with the illustrated process block 604, each biometric attribute is a physiological biometric attribute of the detected one or more objects.

In accordance with the illustrated process block 604, the physiological biometric attribute is one or more of the height, weight, face, voice, eyes, and fingerprint of the detected one or more objects.

The method 600 may then proceed to illustrated process block 606, which includes dynamically executing a biometric attribute analysis of the biometric sensor data and stored biometric data of the detected one or more objects.

In accordance with the illustrated process block 608, executing the biometric attribute analysis data comprises executing a comparison of one or more of the height, weight, face, voice, eyes, and fingerprint of the detected one or more objects to a predetermined threshold biometric value.

If "Yes," i.e., should the comparison conclude the detected one or more objects is a biometric match or otherwise biometric corresponds to a predetermined threshold biometric value, the method 600 then proceeds to process block 610, which includes automatically controlling the vehicle to allow access into the vehicle passenger cabin.

In accordance with the example illustrated process block 610, causing the automatic control of the vehicle comprises causing the vehicle to activate/deactivate one or more vehicle systems.

In accordance with the example illustrated process block 610, causing the vehicle to activate/deactivate one or more vehicle systems comprises automatically unlocking each door of the vehicle.

In accordance with the example illustrated process block 610, causing the vehicle to activate/deactivate one or more vehicle systems comprises automatically enabling activation of the vehicle engine.

In accordance with the example illustrated process block 610, causing the vehicle to activate/deactivate one or more vehicle systems comprises automatically transmitting one or more of a visual alarm, an audio alarm, and a haptic alarm.

In accordance with the example illustrated process block 610, causing the vehicle to activate/deactivate one or more vehicle systems comprises automatically transmitting a notification to an owner of the vehicle.

In accordance with the example illustrated process block 610, causing the vehicle to activate/deactivate one or more vehicle systems comprises automatically activating the vehicle HVAC system.

If "No," i.e., should the comparison conclude the detected one or more objects is not a biometric match or otherwise does not biometric correspond to the predetermined threshold biometric value, the method 600 then proceeds to process block 612, which includes automatically controlling the vehicle to prevent access into the vehicle passenger cabin.

In accordance with the example illustrated process block 612, causing the automatic control of the vehicle comprises causing the vehicle to activate/deactivate one or more vehicle systems.

In accordance with the example illustrated process block 612, causing the vehicle to activate/deactivate one or more vehicle systems comprises automatically locking each door of the vehicle.

In accordance with the example illustrated process block 612, causing the vehicle to activate/deactivate one or more vehicle systems comprises automatically closing each window of the vehicle.

In accordance with the example illustrated process block 612, causing the vehicle to activate/deactivate one or more vehicle systems comprises automatically disabling activation of the vehicle engine.

In accordance with the example illustrated process block 612, causing the vehicle to activate/deactivate one or more vehicle systems comprises automatically transmitting one or more of a visual alarm, an audio alarm, and a haptic alarm.

In accordance with the example illustrated process block 612, causing the vehicle to activate/deactivate one or more vehicle systems comprises automatically transmitting a notification to an owner of the vehicle.

The computer-implemented method 600 can terminate or end after execution of illustrated process block 612.

The terms "coupled," "attached," or "connected" may be used herein to refer to any type of relationship, direct or indirect, between the components in question, and may apply to electrical, mechanical, fluid, optical, electromagnetic, electro-mechanical or other connections. Additionally, the terms "first," "second," etc. are used herein only to facilitate discussion, and carry no particular temporal or chronological significance unless otherwise indicated. The terms "cause" or "causing" means to make, force, compel, direct, command, instruct, and/or enable an event or action to occur or at least be in a state where such event or action may occur, either in a direct or indirect manner.

Those skilled in the art will appreciate from the foregoing description that the broad techniques of the exemplary embodiments may be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

What is claimed is:

1. A vehicle system of a vehicle, comprising:
   one or more processors; and
   a non-transitory memory comprising a set of instructions executable by the one or more processors to cause the one or more processors to:
   cause a dynamic detection, in an ambient environment of the vehicle, of a presence of one or more persons within a predetermined threshold distance of the vehicle;
   cause a dynamic detection of one or more biometric attributes of the detected one or more persons, wherein the one or more biometric attributes include a height value of the one or more persons; and
   automatically control the vehicle in response to dynamically executing a biometric attribute analysis of the one or more biometric attributes by
   enabling a vehicle engine and automatically activating a vehicle heating, ventilation, and air conditioning system when the height value is greater than a threshold,
   disabling activation of the vehicle engine, and one or more of locking doors of the vehicle or closing windows of the vehicle when the height value is less than the threshold, and disabling activation of the vehicle engine, and automatically activating the vehicle heating, ventilation, and air conditioning system when the height value is below the threshold and the one or more persons gains access to a passenger cabin of the vehicle.

2. The vehicle system of claim 1, wherein the set of instructions are executable by the one or more processors to cause the one or more processors to:
dynamically execute the biometric attribute analysis based on biometric sensor data and stored biometric data.

3. The vehicle system of claim 2, wherein the height value corresponds to a height of the detected one or more persons.

4. The vehicle system of claim 3, wherein the threshold is a predetermined threshold height value.

5. The vehicle system of claim 1, further wherein to automatically control the vehicle, the set of instructions cause the one or more processors to automatically lock the doors of the vehicle when the height value is less than the threshold.

6. The vehicle system of claim 1, further wherein to automatically control the vehicle, the set of instructions cause the one or more processors to automatically close the windows of the vehicle when the height value is less than the threshold.

7. The vehicle system of claim 1, further wherein the set of instructions cause the one or more processors to:
automatically transmit to a computing device associated with an owner of the vehicle, a haptic alarm and current Global Positioning System (GPS) coordinates of the vehicle when the height value is less than the threshold and the one or more persons gains access to a passenger cabin of the vehicle;
receive a return communication from the owner of the vehicle authorizing the one or more persons to operate the vehicle; and
permit the one or more persons to operate the vehicle based on the owner authorizing the one or more persons.

8. The vehicle system of claim 1, further wherein the set of instructions cause the one or more processors to automatically transmit a notification to an owner of the vehicle when the height value is less than the threshold.

9. A computer-implemented method of operating a vehicle, the method comprising:
causing a dynamic detection, in an ambient environment of the vehicle, of a presence of one or more persons within a predetermined threshold distance of the vehicle;
causing a dynamic detection of one or more biometric attributes of the detected one or more persons, wherein the one or more biometric attributes include a height value of the one or more persons; and
automatically controlling the vehicle in response to dynamically executing a biometric attribute analysis of the one or more biometric attributes by
enabling a vehicle engine and automatically activating a vehicle heating, ventilation, and air conditioning system when the height value is greater than a threshold,
disabling activation of the vehicle engine, and one or more of locking doors of the vehicle or closing windows of the vehicle when the height value is less than the threshold,
disabling activation of the vehicle engine, and automatically activating the vehicle heating, ventilation, and air conditioning system when the height value is below the threshold and the one or more persons gains access to a passenger cabin of the vehicle.

10. The computer-implemented method of claim 9, wherein dynamically executing the biometric attribute analysis is based on biometric sensor data and stored biometric data.

11. The computer-implemented method of claim 10, wherein the height value corresponds to a height of the detected one or more persons.

12. The computer-implemented method of claim 11, wherein the threshold includes a predetermined threshold height value.

13. The computer-implemented method of claim 9, wherein the automatically controlling includes automatically locking the doors of the vehicle when the height value is less than the threshold.

14. The computer-implemented method of claim 9, wherein the automatically controlling includes automatically closing the windows of the vehicle when the height value is less than the threshold.

15. The computer-implemented method of claim 9, wherein the method further comprises:
automatically transmitting to a computing device associated with an owner of the vehicle, a haptic alarm and current Global Positioning System (GPS) coordinates of the vehicle when the height value is less than the threshold and the one or more persons gains access to the passenger cabin of the vehicle;
receiving a return communication from the owner of the vehicle authorizing the one or more persons to operate the vehicle; and
permitting the one or more persons to operate the vehicle based on the owner authorizing the one or more persons.

16. A vehicle, comprising:
a sensor module having one or more sensors;
one or more vehicle systems; and
a non-transitory memory operatively coupled to one or more processors, the non-transitory memory comprising a set of instructions executable by the one or more processors to cause the one or more processors to:
cause a dynamic detection of, via the sensor module and in an ambient environment of the vehicle, a presence of one or more persons within a predetermined threshold distance of the vehicle;
cause a dynamic detection of one or more biometric attributes of the detected one or more persons, wherein the one or more biometric attributes include a height value of the one or more persons;
automatically control the vehicle systems in response to dynamically executing a biometric attribute analysis of the one or more biometric attributes by enabling a vehicle engine and automatically activating a vehicle heating, ventilation, and air conditioning system when the height value is greater than a threshold, and disabling activation of the vehicle engine, and one or more of locking doors of the vehicle or closing windows of the vehicle when the height value is less than the threshold;
automatically transmit to a computing device associated with an owner of the vehicle, a haptic alarm and current Global Positioning System (GPS) coordinates of the vehicle when the height value is less than the threshold and the one or more persons gains access to a passenger cabin of the vehicle;

receive a return communication from the owner of the vehicle authorizing the one or more persons to operate the vehicle; and permit the one or more persons to operate the vehicle based on the owner authorizing the one or more persons.

17. The vehicle of claim 16, wherein the set of instructions are executable by the one or more processors to cause the one or more processors to:

dynamically execute the biometric attribute analysis based on biometric sensor data and stored biometric data.

* * * * *